United States Patent

Iwashita et al.

(10) Patent No.: US 7,923,956 B2
(45) Date of Patent: Apr. 12, 2011

(54) CONTROL DEVICE FOR SERVO DIE CUSHION

(75) Inventors: Yasusuke Iwashita, Yamanashi (JP);
Tadashi Okita, Yamanashi (JP);
Hiroyuki Kawamura, Yamanashi (JP);
Satoshi Ikai, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 12/610,174

(22) Filed: Oct. 30, 2009

(65) Prior Publication Data

US 2010/0207566 A1  Aug. 19, 2010

(30) Foreign Application Priority Data

Feb. 16, 2009 (JP) .................. 2009-033234

(51) Int. Cl.
*G05B 5/01* (2006.01)
(52) U.S. Cl. .................... 318/615; 318/568.17; 318/566; 318/434
(58) Field of Classification Search .................. 318/615, 318/568.17, 566, 434
See application file for complete search history.

(56) References Cited

U.S. PATENT DOCUMENTS 5,732,195 A * 3/1998 Nakata et al. ................. 700/260
6,486,629 B2 * 11/2002 Kato et al. .................... 318/432

FOREIGN PATENT DOCUMENTS

| JP | 10-202327 A | 8/1998 |
|---|---|---|
| JP | 2006-130524 A | 5/2006 |
| JP | 2006-130533 A | 5/2006 |
| JP | 2007-007716 A | 1/2007 |
| JP | 2007-014965 A | 1/2007 |
| JP | 2007-030009 A | 2/2007 |
| JP | 2007-038238 A | 2/2007 |
| JP | 2007-069248 A | 3/2007 |
| JP | 2007-111704 A | 5/2007 |
| JP | 2007-253212 A | 10/2007 |
| JP | 2008-062254 A | 3/2008 |

\* cited by examiner

*Primary Examiner* — Walter Benson
*Assistant Examiner* — David S Luo
(74) *Attorney, Agent, or Firm* — Lowe Hauptman Ham & Berner LLP

(57) ABSTRACT

A control device, for a servo die cushion, capable of improving a response after overshoot generated by collision of a slide and a die cushion. The control device has a local maximum point judging part which judges a local maximum point based on the detected speed of the servomotor; a speed correction value calculating part which calculates a speed correction value for the servomotor based on the judgment result and the detected speed of the slide; a second force commanding part which generates a second force command value, the second force command value decreasing from an initial value to a first force command value, the initial value being equal to the force detected value when reaching generally the local maximum point. The force command value is switched from the first force command value to the second force command value, when the force detected value reaches the local maximum point.

4 Claims, 3 Drawing Sheets

CONTROL DEVICE FOR SERVO DIE CUSHION

RELATED APPLICATIONS

The present application claims priority from Japanese Patent Application No. 2009-33234, filed on Feb. 16, 2009, the entire contents of which are fully incorporated herein by reference.

BACKGROUND OF THE INVENTION

1. Field of the Invention

The present invention relates to a control device for a die cushion mechanism, in particular, to a control device capable of controlling force generated by a die cushion mechanism of a press machine.

2. Description of the Related Art

It is known that a press machine, for bending, drawing or punching, etc., is provided with a die cushion mechanism, as an attached device, for applying a predetermined amount of force or pressure, to a movable support member (generally called a slide) supporting a first mold for press working, from another support member (generally called a bolster) supporting a second mold. The die cushion mechanism is generally configured such that the slide (or the first mold), moving in a mold-clamping direction, directly or indirectly collides with a movable element (generally known as a cushion pad) held at a predetermined pressure, and until the molding is finished, the cushion pad is moved with the slide while applying force or pressure to the slide. During this operation, it is possible to prevent wrinkles from forming in a workpiece to be pressed by, for example, the clamping an area around a site of the workpiece to be pressed between the cushion pad and the slide.

Many conventional die cushion mechanisms use hydraulic or pneumatic units as driving sources. However, control by a hydraulic or a pneumatic unit can only be carried out under constant pressure. It is preferable that the pressure during drawing be varied in response to the amount of the drawing; however, the amount of pressure cannot be varied in the hydraulic or pneumatic unit.

In recent years, a die cushion mechanism using a servomotor as a driving source has been used to carry out force control, with a fast response, as described in Japanese Unexamined Patent Publication (Kokai) No. 10-202327. In the die cushion mechanism described in this publication, a cushion pad positioned below a slide of a press machine may be upwardly and downwardly moved by a servomotor, corresponding to the rise and fall of the slide. The servomotor operates by force control based on a force command value predetermined corresponding to the position of the cushion pad, and adjusts a force or pressure applied to the slide from the cushion pad, while moving the cushion pad with the slide. Collision and the pressure, between the slide and the cushion pad, are detected by detecting a load applied to an output axis of the servomotor via the cushion pad.

In a die cushion mechanism having a servomotor as a driving source (hereinafter, referred to as a servo die cushion), the force control is carried out by a force control loop including P control or PI control using a force command value and a force detected value. However, since the die cushion controls the force while moving with the slide, it is difficult to control the variability of the force due to the relative movement of the die cushion to the slide, by means of only the force control loop, the response of which cannot be considerably raised. In order to solve the problem, for example, Japanese Unexamined Patent Publication (Kokai) No. 2006-130524 discloses a technique to control the variability of the force due to the relative movement of the die cushion to the slide, by correcting a speed command value generated by the force control loop using a speed detected value of the slide. Due to this, the workload of the force control loop may be reduced and the response to a force command may be improved.

Generally, when the servomotor as the driving source has a large amount of torque, the preferable force control may be carried out. However, when the torque of the servomotor is not sufficient, such as when the number of press actions per unit time is large relative to the torque of the servomotor, a force detected value may not be properly controlled corresponding to a force command value. This is because a conventional press machine is relatively large and the rigidity of the slide and the die cushion cannot be sufficiently increased. In such a case, a gain of the force control loop cannot be sufficiently increased, and thus a response of the force control loop cannot be improved.

Concretely, as shown in FIG. 4$a$, when the servomotor has a sufficient torque, the force detected value (a dashed line) smoothly comes closer to the force command value (a solid line). However, as shown in FIG. 4$b$, when the torque of the servomotor is not sufficient, a force deviation may be increased due to an overshoot in which the force detected value (a dashed line) substantially exceeds the force command value. In such a case, an overshoot and an undershoot are repeated until the force deviation converges, resulting in much time being required until the force deviation converges.

SUMMARY OF THE INVENTION

An object of the present invention is to provide a control device for a servo die cushion, capable of improving a response after the overshoot generated by the collision of the slide and die cushion even when the torque of the servomotor is not sufficient.

According to one aspect of the present invention, there is provided a control device for a die cushion mechanism which generates a force applied to a slide of a press machine by using a servomotor as a driving source, the control device comprising: a first force commanding part which commands a first force command value predetermined for the die cushion mechanism; a force detecting part which detects the force generated by the die cushion mechanism; a motor speed commanding part which commands the speed of the servomotor; a motor speed detecting part which detects the speed of the servomotor; a motor speed controlling part which controls the speed of the servomotor; a local maximum point judging part which judges whether the force value, detected after the collision of the slide and the die cushion mechanism, reaches a generally local maximum point; a second force commanding part which generates a second force command value, the second force command value decreasing from an initial value to the first force command value, the initial value being equal to the force detected value when reaching generally the local maximum point; a speed command calculating part which calculates a first speed command value based on the difference between the force detected value and the first or second force command value; a speed correction value calculating part which calculates a speed correction value for the servomotor based on a command speed for the slide, a speed detected value of the slide or the second force command value; wherein, before the force detected value reaches the local maximum point, the speed command calculating part calculates the first speed command value based on the first force command value, and the speed correction value calculating part calculates the speed correction value based on the command speed for the slide or the speed detected value of the slide; wherein, after the force detected value reaches the local maximum point, the speed command calculating part calculates the first speed command value based on the second force command value, and the speed correction value calculating part calculates the speed correction value based on the summation of a differential value of the second force command value multiplied by a certain constant and the command speed for the slide or the speed detected value of the slide; and wherein the motor speed commanding part calculates a second speed command value by adding the speed correction value to the first speed command value, and sends the second speed command value to the motor controlling part.

The second force commanding part may linearly decrease the second force command value from the initial value to the first force command value.

Alternatively, the second force commanding part may exponentially decrease the second force command value from the initial value to the first force command value.

The local maximum point judging part may judge that the force detected value reaches the local maximum point when the differential value of the force detected value falls below a predetermined value.

Alternatively, the local maximum point judging part may judge that the force detected value reaches the local maximum point when the difference between the speed of the slide and the speed of the die cushion calculated by the speed detected value of the servomotor falls below a predetermined value.

BRIEF DESCRIPTION OF THE DRAWINGS

The above and other objects, features and advantages of the present invention will be made more apparent by the following description of the preferred embodiments thereof with reference to the accompanying drawings wherein.

DETAILED DESCRIPTION

Figure 1:
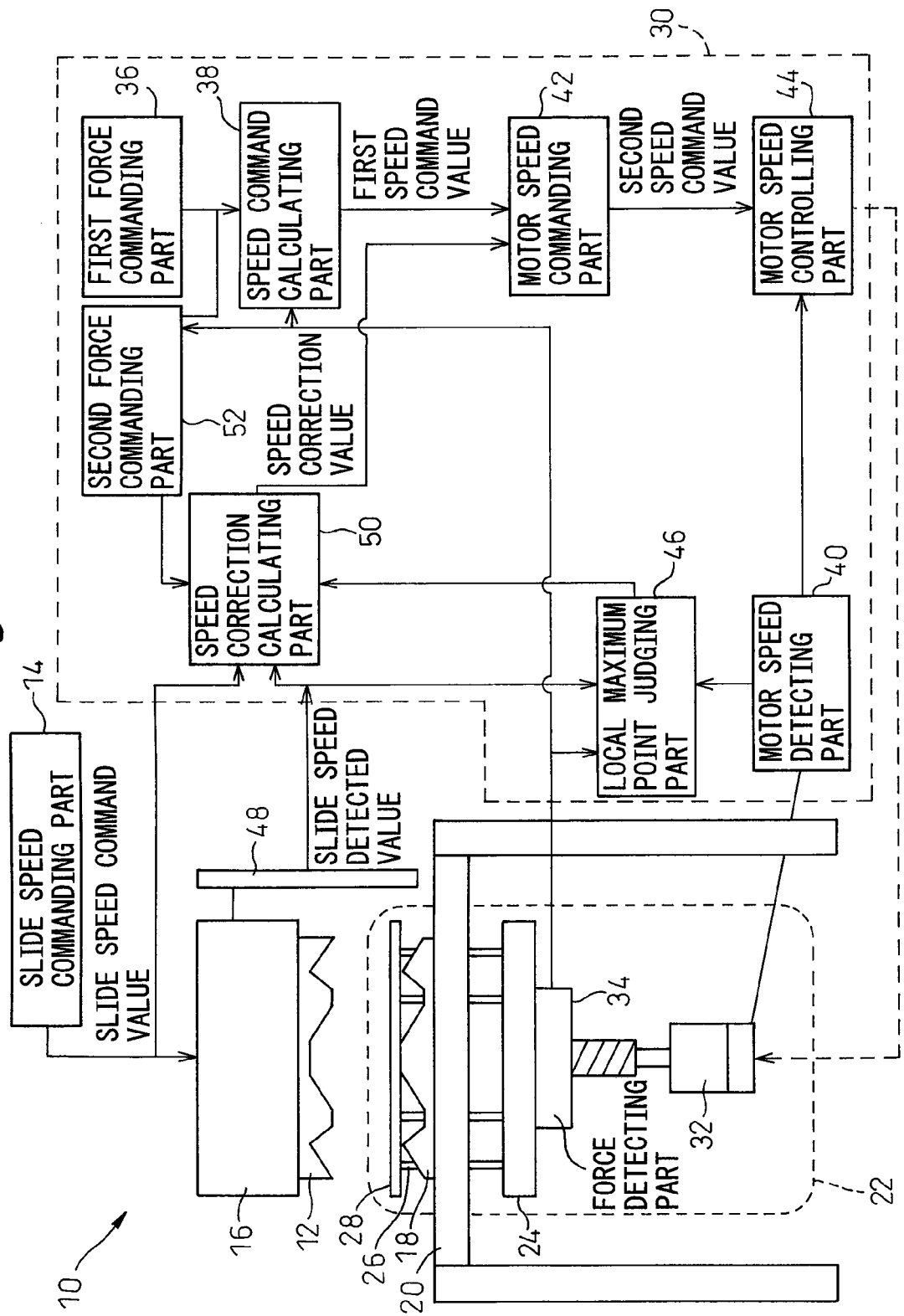
FIG. 1 shows a configuration of a press machine including a control device for a servo die cushion according to the present invention.

FIG. 1 shows a schematic configuration of a press machine including a control device or controller for a servo die cushion according to the invention. A press machine 10 includes a slide 16, supporting a first mold 12, driven by a drive mechanism (not shown) based on a slide speed command value from a slide commanding part 14, a bolster 20 supporting a second mold 18, and a die cushion mechanism 22 configured to apply a required force to slide 16 from the side of bolster 20. Die cushion mechanism 22 is configured such that slide 16, moving in a mold-clamping direction, directly or indirectly collides with a cushion pad 24 held at a predetermined pressure, and until the molding is finished, cushion pad 24 is moved with slide 16 while applying force or pressure to slide 16. During this operation, it is possible to prevent wrinkles from forming in a workpiece 28, supported by cushion pins 26 between cushion pad 24 and slide 16, by, for example, clamping an area around a site of workpiece 28.

A control device or controller 30 for the servo die cushion according to a preferred embodiment of the invention, used in press machine 10 including slide 16 and die cushion mechanism 22 having cushion pad 24 configured to move corresponding to the motion of slide 16, controls a servomotor 32 which drives cushion pad 24 such that a required force (pressure) is generated between cushion pad 24 and slide 16. The force generated between cushion pad 24 and slide 16 may be detected by a force detecting part 34, such as a force sensor. A component of press machine 10 other than controller 30 may be conventional.

As shown in FIG. 1, controller 30 has a first force commanding part 36 which commands a first force command value to be generated between die cushion mechanism 22 and slide 16, a speed command calculating part 38 which generates a speed command for servomotor 32 based on the first force command value output from first force commanding part 36 and a force value detected by force detecting part 34, a motor speed detecting part 40, such as a speed sensor, which detects the speed of servomotor 32, a motor speed commanding part 42 which generates a second speed command value for servomotor 32 based on the first speed command value output from speed command calculating part 38 and a speed correction value (as described below), and a motor speed controlling part 44 which controls servomotor 32 based on the second speed command value from motor speed commanding part 42. Controller 30 also has a local maximum point judging part 46 which judges a local maximum point (as described below) based on the speed of servomotor 32 detected by motor speed detecting part 40, a speed correction value calculating part 50 which calculates a speed correction value (as described below) based on the result of judgment of local maximum point judging part 46 and the speed of slide 16 detected by a slide speed detecting part 48, such as a position sensor, and a second force commanding part 52 which generates a second force command value, the second force command value decreasing from an initial value to the first force command value, the initial value being equal to the force detected value when reaching the local maximum point. The second force command value generated by second force commanding part 52 is used, instead of the first command value, after the force command value reaches the local maximum point, as described below.

Figure 2:
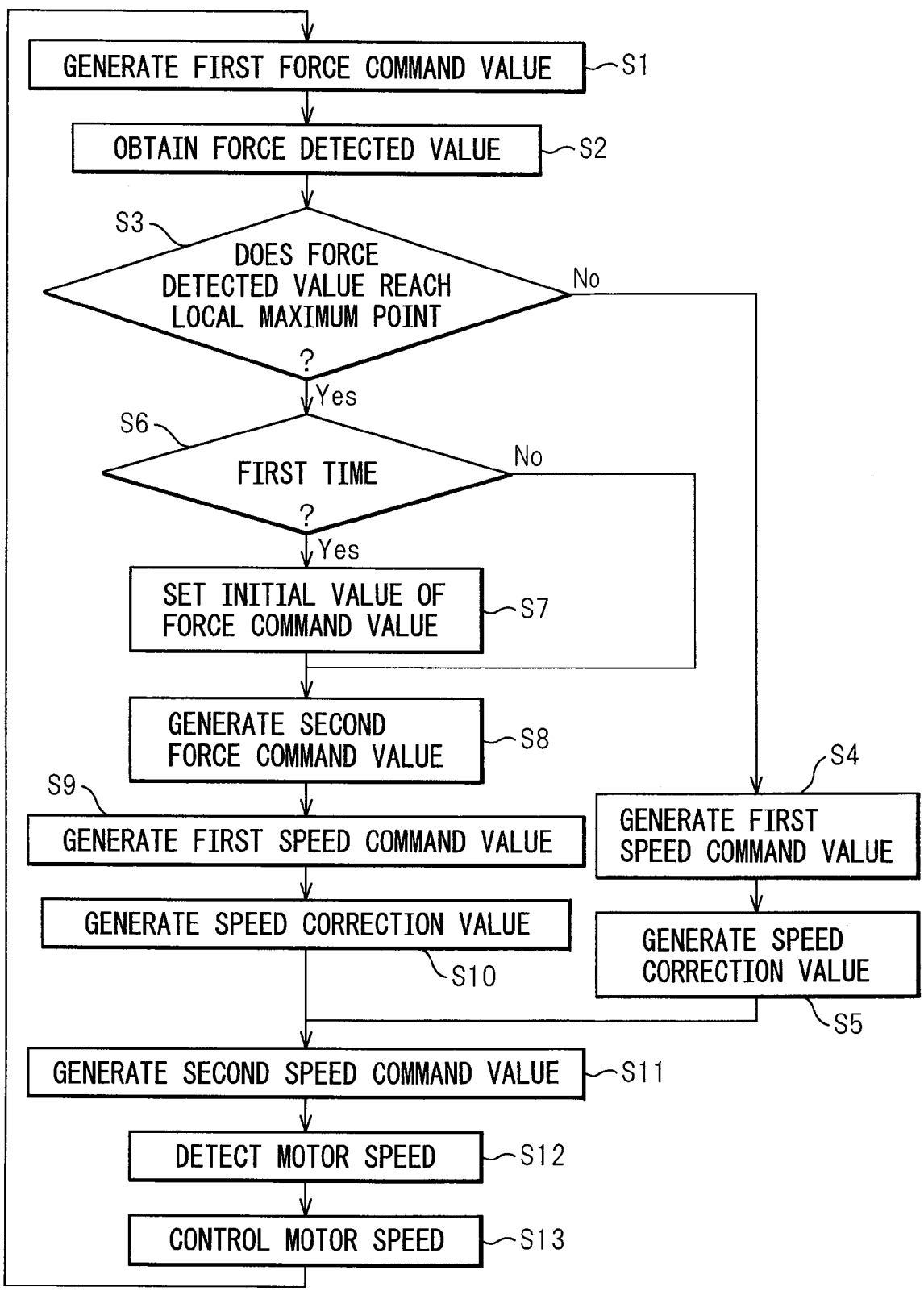
FIG. 2 is a flowchart showing a procedure of the control device of FIG. 1.

FIG. 2 is a flowchart indicating a procedure of controller 30 for the servo die cushion. First, in step S1, the first force command value is generated in first force commanding part 36. The first force command value is previously set in a memory (not shown), as the force to be generated between die cushion mechanism 22 and slide 16.

In the next step S2, the force generated between cushion pad 24 and slide 16 is detected by force detecting part 34, and then, in step S3, local maximum point judging part 46 judges whether the detected force reaches the local maximum point or not. In judging the local maximum point, local maximum point judging part 46 may judge that the force detected value reaches the local maximum point when the differential value of the force detected value falls below a predetermined value (for example, zero or a positive number close to zero). Otherwise, local maximum point judging part 46 may judge that the force detected value reaches the local maximum point when the difference between the speed of the slide and the speed of the die cushion calculated by the speed detected value of the servomotor falls below a predetermined value (zero or a positive number close to zero). In addition, the speed of the die cushion may be calculated by multiplying the detected speed value of the motor by a reduction ratio. Further, the reduction ration may be constant or variable.

When the detected force value does not reach the local maximum point, the procedure progresses to step S4 so as to execute normal speed control. In other words, speed command calculating part 38 generates the first speed command value based on the first force command value from first force commanding part 36. The first speed command value ($Vc_1$) may be calculated by using the first force command value ($Fc_1$) and the force detected value (Fd), for example, as shown in following equation (1). In equation (1), the character "f" means a proper function for converting the force to the speed.

$$Vc_1 = f(Fc_1 - Fd) \quad (1)$$

In the next step S5, speed correction calculating part 50 calculates a speed correction value to be sent to motor speed commanding part 42. The speed correction value in this case (before the force detected value reaches the local maximum point) is substantially equal to the speed of slide 16. As the speed of the slide, the slide speed command value generated by slide speed commanding part 14 or the detected speed (the actual speed) of the slide detected by slide speed detecting part 48 may be used.

On the other hand, when it is judged in step S3 that the force detected value reaches the local maximum point, second force commanding part 52 is used instead of first force commanding part 36. Concretely, the procedure progresses to step S6 so as to judge whether the force detected value reaches the local maximum point first time. If it is first time, the procedure progresses to step S7 so as to set an initial value of the second force command value to be output by second force commanding part 52. This initial value is substantially equal to the detected force value when it reaches the local maximum point.

In the next step S8, second force commanding part 52 generates the second force command value. When it is judged in step S6 that the detected force reaches the local maximum point second or more times (in other words, the initial value of the force command value is already set), the procedure progresses to also step S8. The second force command value is generated so as to decrease from the initial value when reaching the local maximum point to the first force command value. For example, when the first command value ($Fc_1$) is step-input, the second force command value ($Fc_2$) may be calculated by following equation (2). In equation (2), character "n" is equal to 1 when the local maximum point judging part judges the detected force reaches the local maximum point, and characters "T" and "Δt" are a time constant and a sampling time, respectively. Further, as an initial condition, $Fc_2(0) = Fd(0)$ is true.

$$Fc_2(n) = Fc_1(n) + (Fc_2(n-1) - Fc_1(n)) \cdot \exp(-\Delta t \cdot (n-1)/T) \quad (2)$$

In the above equation, the second force command value ($Fc_2$) exponentially decreases. Otherwise, the second force command value may linearly decrease, by using following equations (3) and (4). In this connection, equation (3) is used when "n" varies from one to (T/Δt+1), and equation (4) is used when "n" exceeds (T/Δt+1). Similarly to equation (2), character "n" is equal to 1 when the local maximum point judging part judges the detected force reaches the local maximum point, and characters "T" and "Δt" are a time constant and a sampling time, respectively. Further, as an initial condition, $Fc_2(0) = Fd(0)$ is true.

$$Fc_2(n) = Fc_1(n) - (Fc_2(n-1) - Fc_1(n))/T \cdot \Delta t \cdot (n-1) \quad (3)$$

$$Fc_2(n) = Fc_1(n) \quad (4)$$

In the next step S9, speed command calculating part 38 generates the first speed command value based on the second force command value as determined above. For example, the first speed command value ($Vc_1$) may be calculated by following equation (5). In equation (5), the character "f" means a proper function for converting the force to the speed.

$$Vc_1 = f(Fc_2 - Fd) \quad (5)$$

In the next step S10, speed correction calculating part 50 calculates a speed correction value to be sent to motor speed commanding part 42. The speed correction value (Va) in this case (when the detected force reaches the local maximum point) may be calculated by following equation (6). In equation (6), the slide speed (Vs) may be the speed command value generated by slide speed commanding part 14, or, the actual speed detected by slide speed detecting part 48.

$$Va = (\text{differential value of force command value}) \cdot (\text{constant}) + Vs \quad (6)$$

In step S11 after step 10 or step S5, motor speed commanding part 42 generates the second speed command value. The second speed command value ($Vc_2$) may be calculated by following equation (7), using the speed correction value (Va) as calculated above.

$$Vc_2 = Vc_1 + Va \quad (7)$$

In the next step S12, motor speed detecting part 40 detects the actual speed of servomotor 32. Finally, in step S13, motor speed controlling part 44 controls the speed of the servomotor based on the second speed command value and the detected motor speed. The procedure including steps S1 to S13 is periodically executed in a suitable period of time.

Figure 3:
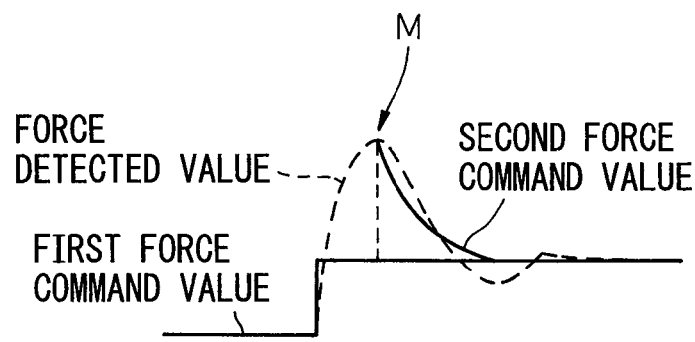
FIG. 3 is a graph showing the relationship between a force command value and a force detected value varied by the control device of the invention.
Figure 4A:
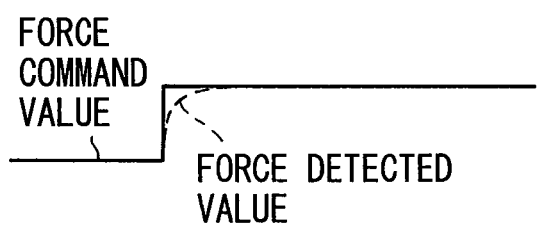
FIG. 4a is a graph showing the relationship between a force command value and a force detected value varied by the control device of the prior art, in which the torque of a servomotor is sufficient.
Figure 4B:
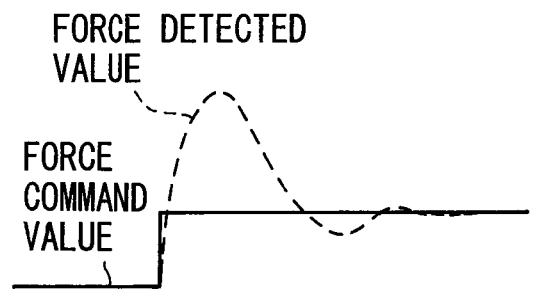
FIG. 4b is a graph showing the relationship between a force command value and a force detected value varied by the control device of the prior art, in which the torque of a servomotor is not sufficient.

FIG. 3 is a diagram explaining the basic concept of the present invention. As described above with reference to FIGS. 4a and 4b, when the torque of the servomotor is not sufficient relative to the torque command and overshoot may occur due to the collision of the slide and the die cushion, a response of the force after the collision may be improved according to the present invention. Concretely, the first force command value is used until the detected force value (a dashed line) reaches local maximum point "M," and the second force command value is used after the detected force value reaches the local maximum point. Due to this, the detected force value after the local maximum point can follow the second force command value, whereby the detected force value converges on a desired value more rapidly than the prior art. Although the second force command value exponentially decreases in an example of the drawings, the second force command value may linearly decreases instead.

In the prior art, in order to reduce the load of force control, the detected speed value of the slide is added to the speed command value. In other words, the detected speed value of the slide in the static state (in which the slide speed is equal to the die cushion speed) is added to the slide speed command value as a feedforward item, since the response of speed control loop is higher than the response of force control loop. On the other hand, the control device of the invention has the speed correction value calculating part which calculates the speed correction value based on the slide speed, the local maximum point judging part which judges whether the detected force value reaches the local maximum point, and the second force commanding part, as well as the first force commanding part, the force detecting part, the motor speed detecting part.

In relation to the slide speed, the die cushion speed and the force (F) between the slide and the die cushion, following equations (8) and (9) are true. Therefore, it could be understood that the inclination of the force corresponds to the difference between the slide speed and the die cushion speed. In the equations, the slide speed in the direction toward the die cushion is represented as a negative value, and the die cushion speed in the direction away from the slide is represented as a negative value.

$$F=\int((\text{die cushion speed})-(\text{slide speed}))dt \qquad (8)$$

$$dF/dt=(\text{die cushion speed})-(\text{slide speed}) \qquad (9)$$

Generally, in a relatively large machine such as a press machine, a structure between the slide and the die cushion may be considered as an elastic body, which may function as a spring element and may be twisted and/or compressed. To such a case, Hooke's law may be approximately applied, and the relationship between the amount of compress of the spring element and the force applied to the end of the spring element is proportionate by using a certain constant (spring constant). Thus, the difference of speed (or the speed correction) between the slide and the die cushion so as to follow the second force command value is calculated by multiplying the differential value of the second force command value by a constant for weighted adjusting. Then, (detected slide speed value+speed correction value) is added to the motor speed command value as a feedforward item. The motor speed control part controls the speed of the motor based on the difference between the motor speed command value and the motor speed detected value. Therefore, in the present invention, the load of force control loop may be reduced relative to the prior art and the accuracy of force control may be improved.

According to the present invention, when overshoot of the force occurs due to the collision between the slide and the die cushion, a response of force after the overshoot may be improved by switching the force command value before and after the local maximum point of the detected force.

By linearly or exponentially decreasing the second force command value, the second force command value may be properly generated by a simple calculation.

The judgment of the local maximum point may be executed by a simple calculation. For example, the local maximum point judging part may judge the force detected value reaches the local maximum point when the differential value of the force detected value falls below a predetermined value. Otherwise, the local maximum point judging part may judge that the force detected value reaches the local maximum point when the difference between the speed of the slide and the speed of the die cushion calculated by the speed detected value of the servomotor falls below a predetermined value.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A control device for a die cushion mechanism which generates a force applied to a slide of a press machine by using a servomotor as a driving source, the control device comprising:

a first force commanding part which commands a first force command value predetermined for the die cushion mechanism;

a force detecting part which detects the force generated by the die cushion mechanism;

a motor speed commanding part which commands the speed of the servomotor;

a motor speed detecting part which detects the speed of the servomotor;

a motor speed controlling part which controls the speed of the servomotor;

a local maximum point judging part which judges whether the force value, detected after the collision of the slide and the die cushion mechanism, reaches a generally local maximum point;

a second force commanding part which generates a second force command value, the second force command value decreasing from an initial value to the first force command value, the initial value being equal to the force detected value when reaching generally the local maximum point;

a speed command calculating part which calculates a first speed command value based on the difference between the force detected value and the first or second force command value;

a speed correction value calculating part which calculates a speed correction value for the servomotor based on a command speed for the slide, a speed detected value of the slide or the second force command value;

wherein, before the force detected value reaches the local maximum point, the speed command calculating part calculates the first speed command value based on the first force command value, and the speed correction value calculating part calculates the speed correction value based on the command speed for the slide or the speed detected value of the slide;

wherein, after the force detected value reaches the local maximum point, the speed command calculating part calculates the first speed command value based on the second force command value, and the speed correction value calculating part calculates the speed correction value based on the summation of a differential value of the second force command value multiplied by a certain constant and the command speed for the slide or the speed detected value of the slide;

and wherein the motor speed commanding part calculates a second speed command value by adding the speed correction value to the first speed command value, and sends the second speed command value to the motor controlling part.

2. The control device as set forth in claim 1, wherein the second force commanding part linearly or exponentially decreases the second force command value from the initial value to the first force command value.

3. The control device as set forth in claim 1, wherein the local maximum point judging part judges that the force detected value reaches the local maximum point when the differential value of the force detected value falls below a predetermined value.

4. The control device as set forth in claim 1, wherein the local maximum point judging part judges that the force detected value reaches the local maximum point when the difference between the speed of the slide and the speed of the die cushion calculated by the speed detected value of the servomotor falls below a predetermined value.

* * * * *